Jan. 10, 1933.     A. H. MITTAG     1,894,114
ELECTRIC POWER CONVERTING APPARATUS
Filed Feb. 26, 1931
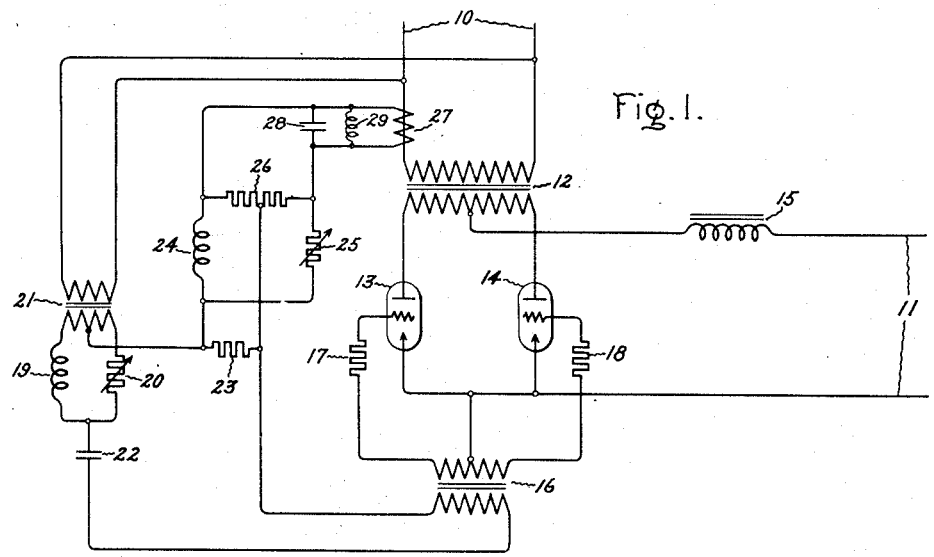
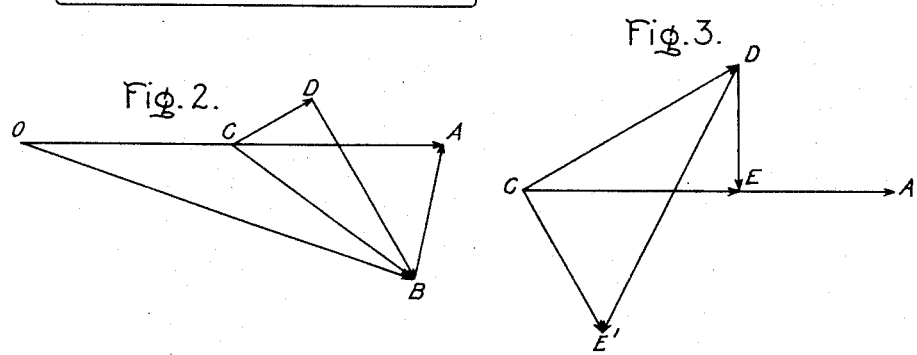
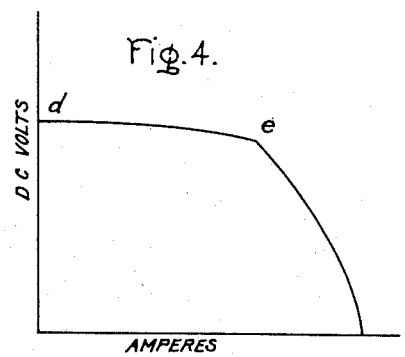
Inventor:
Albert H. Mittag,
by Charles E. Mullan
His Attorney.

Patented Jan. 10, 1933

1,894,114

UNITED STATES PATENT OFFICE

ALBERT H. MITTAG, OF SCHENECTADY, NEW YORK, ASSIGNOR TO GENERAL ELECTRIC COMPANY, A CORPORATION OF NEW YORK

ELECTRIC POWER CONVERTING APPARATUS

Application filed February 26, 1931. Serial No. 518,487.

My invention relates to electric power converting apparatus and more particularly to such apparatus utilizing electric valves for transmitting energy from an alternating current supply circuit to a direct or alternating current load circuit.

In the transmission of energy from an alternating current supply circuit to a load circuit by means of an apparatus including a pair of electric valves, it has become well known to control the average voltage of the load circuit by applying an alternating potential to the grids of the electric valves and retarding the phase of the grid potentials with respect to the anode potentials of the valves. It has been proposed also to effect this shift in phase of the grid potentials automatically in response to variations in an electrical condition of the circuit, such for example as in response to the load current transmitted by the apparatus. In some cases however it has been found desirable to have the regulation curve of the apparatus discontinuous, for example, to maintain the voltage of the load circuit substantially constant for loads less than a predetermined value and to thereafter rapidly decrease the voltage of the load circuit in response to further increases in load current.

It is an object of my invention to provide a method and apparatus for securing improved regulating characteristics of an electric power converting apparatus utilizing electric valves for transmitting energy from an alternating current supply circuit to a direct or alternating current load circuit.

It is a further object of my invention to provide a method and apparatus for regulating electric power converting apparatus including electric valves for transmitting energy from an alternating current supply circuit to a direct or alternating current load circuit in which the voltage of the load circuit is maintained substantially constant for load currents up to a predetermined value and thereafter is decreased rapidly in response to further increases in load current.

In accordance with my invention the average voltage of a direct or alternating current load circuit, energized from an alternating current supply circuit through electric power converting apparatus including a pair of electric valves, is automatically regulated by regulating the phase of the grid potentials of the electric valves. These grid potentials are made up of two components; one, which may be called a shunt component, is constant in magnitude and is adjustably fixed in phase so as to lead the anode potentials of the valves by a substantial angle. The other component, which may be called a series component, is variable in magnitude in accordance with the current transmitted by the power converting apparatus and is adjustably fixed in phase with respect to the load current so as to lag the anode potentials of the valves preferably by an angle of approximately 90 electrical degrees at unity power factor. For values of load current less than a predetermined amount, the lagging component of the series grid potential is insufficient to overcome the leading component of the shunt grid potential so that the resultant grid potential is leading and the valves are fully conductive to maintain a maximum voltage on the load circuit. When the load current rises above a predetermined value, however, the component of the series grid potential overcomes that of the shunt grid potential to retard the phase of the grid potentials of the valves and rapidly decrease the average potential of the direct current circuit upon a further increase in the load current of the apparatus.

For a better understanding of my invention together with other and further objects thereof, reference is had to the following description taken in connection with the accompanying drawing and its scope will be pointed out in the appended claims. Fig. 1 of the accompanying drawing illustrates a specific arrangement by means of which my invention may be carried into effect; Figs. 2 and 3 are vector diagrams to aid in the understanding of my invention, while Fig. 4 represents a typical voltage-current characteristic of the apparatus illustrated in Fig. 1.

Referring to Fig. 1, I have illustrated an apparatus for transmitting energy from an alternating current supply circuit 10 to a direct current load circuit 11. This apparatus comprises a transformer 12 and a pair of electric valves 13 and 14 connected in a well known manner to secure full wave rectification. A smoothing reactor 15 may be connected in the direct current circuit if desired. Electric valves 13 and 14 are each provided with an anode, a cathode and a control grid and may be of any of the several types well known in the art although I prefer to use valves of the vapor electric discharge type. The control grids of the valves 13 and 14 are connected to their common cathode circuit through opposite halves of the secondary winding of a grid transformer 16 and current limiting resistors 17 and 18 respectively. The energizing circuit for the primary winding of grid transformer 16 includes a source of potential derived from an impedance phase shifting circuit comprising a reactor 19 and a variable resistor 20 energized from the alternating current circuit 10 through a transformer 21. A capacitor 22 is preferably connected in series with this circuit in order to advance the phase of the potential applied to the grid transformer 16. The energizing circuit for the primary winding of grid transformer 16 also includes a resistor 23 which derives a potential from a second phase shifting circuit comprising a reactor 24 and a variable resistor 25 connected across a resistor 26 which is included in the secondary circuit of a current transformer 27 connected in series with the alternating current circuit 10. Any suitable filter circuit, for example a parallel connected capacitor 28 and reactor 29, is preferably connected across the transformer 27 to absorb any harmonics due to the rectangular current wave drawn from the circuit 10 by the load circuit 11.

The general principles of operation of a full wave rectifying circuit in which the average voltage of the direct current circuit is controlled by varying the phase relation of the grid potentials of the electric valves will be understood by those skilled in the art so that it is not thought necessary to give a detailed explanation. When the grid potentials of the electric valves are in phase with their anode potentials, the valves are fully conducting during their respective half cycles of positive anode potential and the voltage of the direct current circuit is a maximum. As the phase of the grid potentials is retarded, the valves become conducting at successively later points in their respective half cycles of positive anode potential, and the average voltage of the direct current circuit is gradually reduced. The manner in which the above described regulation characteristic is obtained will be more clearly understood by reference to the vector diagrams of Figs. 2 and 3. In Fig. 2 the vector OA represents the potential of the alternating current circuit 10 which is applied to the anodes of the valves 13 and 14 and to the impedance phase shifting circuit comprising reactor 19 and resistor 20. By properly adjusting the resistor 20 the potential across the midpoints of this circuit may be represented by the vector CB of Fig. 2. This potential is impressed upon a circuit including capacitor 22, the resistor 23 and the grid transformer 16 which, if its leakage reactance be neglected, may be considered as having a resistance characteristic since its load circuit is non-inductive. The vector CB may be resolved into two components, CD the potential appearing across the resistance of the circuit and DB that appearing across the capacitor 22, these two potentials, of course, being substantially in quadrature. When no current is being transmitted by the apparatus so that no potential is impressed upon resistor 23 from the secondary winding of the current transformer 27, the vector CD (Fig. 3) will represent the grid potential applied to the valves 13 and 14 so that these valves are fully conducting during their respective half cycles of positive anode potential and the voltage of the direct current circuit 11 is a maximum. The resistor 25 is so adjusted that the potential derived from the impedance phase shifting circuit comprising reactor 24 and resistor 25 has a phase relation represented by the vector DE of Fig. 3 when the valves are fully conductive and the load on the circuit 10 is at unity power factor. For values of load current less than that corresponding to the magnitude of the vector DE, it will be apparent that the potential applied to the grids of the valves 13 and 14 represented by the vector CE will lead the anode potentials of these valves so that the potential of the direct current circuit 11 will be maintained at its maximum value. However when the load current has increased beyond the value corresponding to the magnitude of the vector DE of Fig. 3, the lagging component of the vector DE will exceed the leading component of the vector CD so that the resultant grid potential will lag the anode potentials and the average voltage of the direct current circuit 11 will be reduced. As the voltage of the direct current circuit is reduced, due to the retarding of the points in the cycle of alternating potential at which the valves are rendered conductive, the power factor of the alternating current is lowered and the phase angle of the vector DE is retarded in phase as well as being increased in magnitude. This tends to produce a compounding effect in reducing the voltage of the direct current circuit. For example, if the load current should increase to a value corresponding to the vector DE' the grid potential will have a phase represented by the vector CE'. The voltage-current characteristics of this apparatus is shown in Fig. 4 in which the portion of the curve *de* corresponds to values of load current from zero up to that corresponding to the vector DE of Fig. 3 beyond which an increase in current will cause a rapid decrease in the average voltage of the circuit 11. While in the above described operation, the load circuit 11 has been referred to as a direct current circuit, it will be obvious to those skilled in the art that the load circuit 11 may be an alternating current circuit, in which case the electric valves 13 and 14 would be reversely connected in parallel. The phase shifting circuit comprising reactor 19 and resistor 20 is provided both for the purpose of determining the voltage-current characteristic of the apparatus and in order to retard the phase of the vector CD with respect to the anode potentials of the valves 13 and 14 in case it is desired gradually to increase the voltage of the circuit 11 from zero when first energizing this circuit. It will be apparent, also, that the voltage-current characteristic of the apparatus may be controlled by adjusting the variable resistor 25 to control the phase relation of the series component of grid potential. In case the direct current circuit 11 includes a smoothing reactor 15 or an inductive load it is only necessary to retard the grid potential CE' substantially ninety degrees in order to reduce the voltage of the direct current circuit 11 to zero. However, if the load circuit 11 is non-inductive it may be necessary to retard the grid potentials of the valves 13 and 14 substantially more than ninety degrees, which can be accomplished easily by decreasing the phase angle of the vectors CD and DE by adjusting resistors 20 and 25, respectively.

While I have described what I at present consider the preferred embodiment of my invention, it will be obvious to those skilled in the art that various changes and modifications may be made without departing from my invention and I therefore aim in the appended claims to cover all such changes and modifications as fall within the true spirit and scope of my invention.

What I claim as new and desire to secure by Letters Patent of the United States, is:

1. In combination, an alternating current supply circuit, a load circuit, electric valve means for transmitting energy therebetween, and means responsive to the rate of energy transfer between said circuits for gradually reducing the average voltage of said load circuit only after said rate of energy transfer has risen to a predetermined value.

2. In combination, an alternating current supply circuit, a load circuit, electric valve means for transmitting energy therebetween, means for normally rendering said valve means conductive, and means responsive to the current flowing between said circuits for gradually reducing the conductivity of said valve means only after said current has reached a predetermined value.

3. In combination, an alternating current supply circuit, a load circuit, means for transmitting energy therebetween including an electric valve provided with an anode, a cathode, and a control grid, means for normally impressing upon said grid an alternating potential advanced in phase with respect to said anode potential, and means responsive to the current transmitted between said circuits for causing said grid potential to lag said anode potential only after said current reaches a predetermined value.

4. In combination, an alternating current supply circuit, a load circuit, means for transmitting energy therebetween including an electric valve provided with an anode, a cathode, and a control grid, means for normally impressing upon said grid an alternating potential component advanced in phase with respect to said anode potential, and means for impressing upon said grid another alternating potential component retarded in phase with respect to said anode potential and variable in magnitude in accordance with variations in the current transmitted between said circuits.

5. In combination, an alternating current supply circuit, a load circuit, means for transmitting energy therebetween including an electric valve provided with an anode, a cathode, and a control grid, a grid circuit for said valve including a source of alternating potential normally advanced in phase with respect to the anode potential of said valve and a second source of alternating potential retarded in phase with respect to said anode potential and variable in magnitude in accordance with variations in the current transmitted between said supply and load circuits.

6. In combination, an alternating current supply circuit, a load circuit, means for transmitting energy therebetween including an electric valve provided with an anode, a cathode, and a control grid, an impedance phase shifting circuit energized from said alternating current circuit, a second impedance phase shifting circuit energized in accordance with the current transmitted between said supply and load circuits, and a grid circuit for said valve including a capacitor and a source of potential derived from each of said phase shifting circuits.

In witness whereof I have hereunto set my hand.

ALBERT H. MITTAG.